(12) United States Patent
Cui

(10) Patent No.: US 9,036,118 B2
(45) Date of Patent: May 19, 2015

(54) NEGATIVE OPTICAL COMPENSATION ASSEMBLY AND METHOD FOR PREPARING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventor: Xiaopeng Cui, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 54 days.

(21) Appl. No.: 14/053,079

(22) Filed: Oct. 14, 2013

(65) Prior Publication Data

US 2014/0104551 A1 Apr. 17, 2014

(30) Foreign Application Priority Data

Oct. 15, 2012 (CN) .......................... 2012 1 0389128

(51) Int. Cl.
| | | |
|---|---|---|
| *G02F 1/1335* | (2006.01) | |
| *G02F 1/1333* | (2006.01) | |
| *G02F 1/1337* | (2006.01) | |
| *G02F 1/1341* | (2006.01) | |
| *G02F 1/13363* | (2006.01) | |

(52) U.S. Cl.
CPC *G02F 1/13363* (2013.01); *G02F 2001/133633* (2013.01)

(58) Field of Classification Search
CPC .......... G02F 1/13363; G02F 1/133634; G02F 1/133788; G02F 1/133753; G02F 1/133711; G02F 1/141; G02F 2001/13415; G02F 1/1337; G02F 1/1334; G02F 1/133718; G02F 1/1341; G02F 1/1339; G02B 5/3083; C09K 19/544
USPC ............................ 349/117, 86, 124, 128, 189
See application file for complete search history.

(56) References Cited

U.S. PATENT DOCUMENTS

| | | | |
|---|---|---|---|
| 2004/0228983 A1* | 11/2004 | Chien et al. ................... | 428/1.1 |
| 2011/0058127 A1* | 3/2011 | Toyooka ........................ | 349/96 |

FOREIGN PATENT DOCUMENTS

CN 101825806 A 9/2010

OTHER PUBLICATIONS

First Chinese Office Action dated May 6, 2014; Appln. No. 201210389128.2.

* cited by examiner

*Primary Examiner* — Mike Qi
(74) *Attorney, Agent, or Firm* — Ladas & Parry LLP

(57) ABSTRACT

A method for preparing a negative optical compensation assembly includes: first providing an alignment chamber composed of a vertical alignment substrate and a horizontal alignment substrate and filling into the alignment chamber a liquid crystal mixture comprising a polymerizable discotic liquid crystal, an adjunct alignment agent, and an ultraviolet absorption pigment, and subjecting the vertical alignment substrate to ultraviolet radiation so as to polymerize the polymerizable discotic liquid crystal within the alignment chamber, thereby obtain the negative optical compensation assembly. This method can obtain hybrid alignment of discotic liquid crystal via a simple process, and therefore reduce the complexity for manufacturing the negative optical compensation assembly.

14 Claims, 4 Drawing Sheets

NEGATIVE OPTICAL COMPENSATION ASSEMBLY AND METHOD FOR PREPARING THE SAME

TECHNICAL FIELD

Embodiments of the technical disclosure relate to a negative optical compensation assembly and a method for preparing the same.

BACKGROUND

Currently, the liquid crystal molecules generally include two types, namely rod-like crystal molecules and discotic liquid crystal molecules. The orientation of a liquid crystal molecule is defined by the relationship between its direction vector and the substrate of a liquid crystal display (LCD). The molecule alignment of rod-like liquid crystal molecules is illustrated in FIG. 1; the rod-like liquid crystal molecules in FIG. 1 (a) are horizontally oriented, while the rod-like liquid crystal molecules in FIG. 1 (b) are vertically oriented. The direction vector of a rod-like liquid crystal molecule is defined as the long axial direction. The molecule alignment of discotic liquid crystal molecules with a uniform orientation is illustrated in FIG. 2; the discotic liquid crystal molecules in FIG. 2(a) are vertically oriented, and the discotic liquid crystal molecules in FIG. 2 (b) are horizontally oriented. The direction vector of a discotic liquid crystal molecule is defined as the direction perpendicular to the disc surface. Usually, the direction of the orientation of a liquid crystal molecule is defined by the relationship between the direction of the substrate and the direction vector of the liquid crystal molecule. If the direction vector of a discotic liquid crystal molecule is perpendicular to the substrate, its molecule alignment is a vertical orientation of the discotic liquid crystal molecule; and if the direction vector of a discotic liquid crystal molecule is parallel to the substrate, its molecule alignment is a horizontal orientation of the discotic liquid crystal molecule.

Usually, the uniform orientation of discotic liquid crystal molecules can be achieved by techniques such as surface modification, polarization light alignment treatment, electric/magnetic field alignment treatment, mechanical rubbing, zone melting process, or the like. These alignment techniques are usually limited by factors such as high requirements on the equipment or light source, complicated processing, or the like. For the more complicated hybrid alignment of discotic liquid crystal molecules, often two or more alignment techniques need to be applied in combination, which therefore requires more complicated process or molecule design for the alignment agent. These factors have limited the research and application of the optical functions of the discotic liquid crystal.

SUMMARY

Embodiments of the technical disclosure provide a negative optical compensation assembly and a method for preparing the same, for reducing the complexity of the process for manufacturing a negative optical compensation assembly.

According to one aspect of the technical disclosure, there is provided a negative optical compensation assembly comprising a vertical alignment substrate and a horizontal alignment substrate disposed in parallel to each other, wherein a liquid crystal mixture is disposed between the vertical alignment substrate and the horizontal alignment substrate, and the liquid crystal mixture comprises a discotic liquid crystal polymer, an adjunct alignment agent and an ultraviolet absorption pigment, the molecules of the ultraviolet absorption pigment being accumulated on a side of the vertical alignment substrate, the molecules of the adjunct alignment agent being accumulated on a side of the horizontal alignment substrate, and from the vertical alignment substrate to the horizontal alignment substrate, the discotic liquid crystal molecules in the discotic liquid crystal polymer exhibiting hybrid alignment gradually changing from vertical alignment to horizontal alignment.

According to another aspect of the technical disclosure, there is provided a method for preparing a negative optical compensation assembly comprising: providing a vertical alignment substrate and a horizontal alignment substrate which are disposed in parallel to each other to form an alignment chamber; providing a liquid crystal mixture comprising a polymerizable discotic liquid crystal, an adjunct alignment agent, and an ultraviolet absorption pigment; filling the liquid crystal mixture into the alignment chamber within a temperature range of the liquid crystal phase of the liquid crystal mixture; and subjecting the vertical alignment substrate to ultraviolet radiation to obtain the negative optical compensation assembly.

The embodiments of the technical disclosure achieve the hybrid alignment of a discotic liquid crystal by a simple process, which reduces the complexity of the process for manufacturing the negative optical compensation assembly.

Further scope of applicability of the present technical disclosure will become apparent from the detailed description given hereinafter. However, it should be understood that the detailed description and specific examples, while indicating preferred embodiments of the technical disclosure, are given by way of illustration only, since various changes and modifications within the spirit and scope of the technical disclosure will become apparent to those skilled in the art from the following detailed description.

BRIEF DESCRIPTION OF THE DRAWINGS

The present technical disclosure will become more fully understood from the detailed description given hereinafter and the accompanying drawings which are given by way of illustration only, and thus are not limitative of the present technical disclosure and wherein.

DETAILED DESCRIPTION

Usually, an optical positive liquid crystal is used for a thin film transistor liquid crystal display (TFT-LCD), which is prone to give rise to a positive phase delay when viewed from a wide angle, and this causes the issues of reduction of contrast and visual angle. In contrast, a discotic liquid crystal has an optical negative property opposite to the optical positive liquid crystal, has a negative phase delay, and such a negative phase delay can be used to compensate the positive phase delay of a TFT-LCD. Therefore, the optical negative discotic liquid crystal material can be used to manufacture the negative optical compensation assembly of a TFT-LCD. Since the narrow visual angle of an LCD is caused by the presence of molecules having tilted alignment, the compensation property of a discotic liquid crystal having such a property is determined by the state of the molecular hybrid alignment of the discotic molecules. Therefore, a discotic liquid crystal having hybrid alignment can have the optical compensation effect. Consequently, how to achieve the hybrid alignment of a discotic liquid crystal by a simple technique has become crucial to researches on the application of discotic liquid crystals and making them into devices.

Currently, in order to achieve the hybrid alignment of a discotic liquid crystal, two or more alignment techniques need to be combined, and more complicated process or molecule design of the alignment agent is required, which has high process complexity, thereby resulting in a high process complexity for preparing the negative optical compensation assembly.

One embodiment of the technical disclosure provides a negative optical compensation assembly and a method for preparing the same comprising: first providing an alignment chamber composed of a vertical alignment substrate and a horizontal alignment substrate, and filling into the chamber a liquid crystal mixture comprising a polymerizable discotic liquid crystal, an adjunct alignment agent, and an ultraviolet absorption pigment, and then subjecting the vertical alignment substrate to ultraviolet radiation to obtain the negative optical compensation assembly. By this method, in an embodiment of the technical disclosure, the hybrid alignment of the discotic liquid crystals can be achieved via a simple process, thereby reducing the complexity of the process for manufacturing the negative optical compensation assembly.

Figure 1:
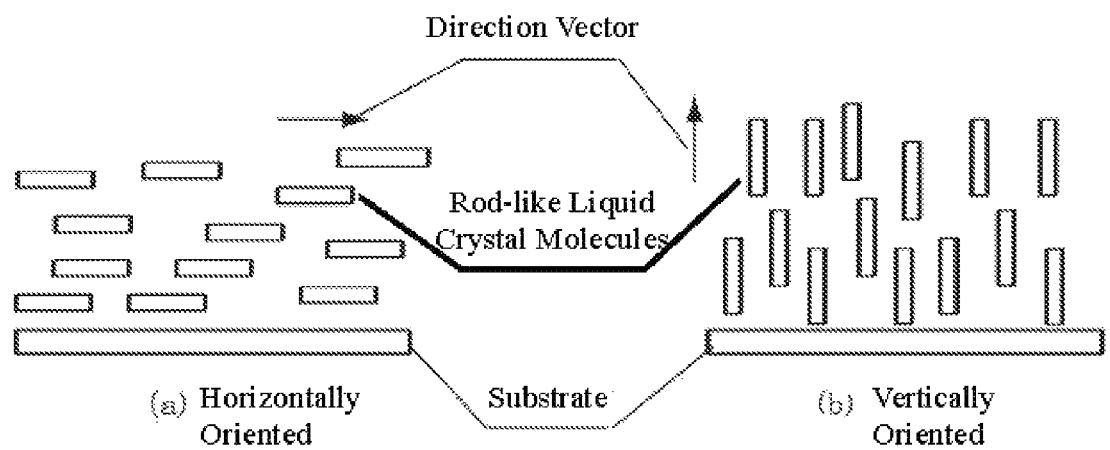
FIG. 1 is a schematic diagram of the alignment of rod-like liquid crystal molecules.
Figure 2:
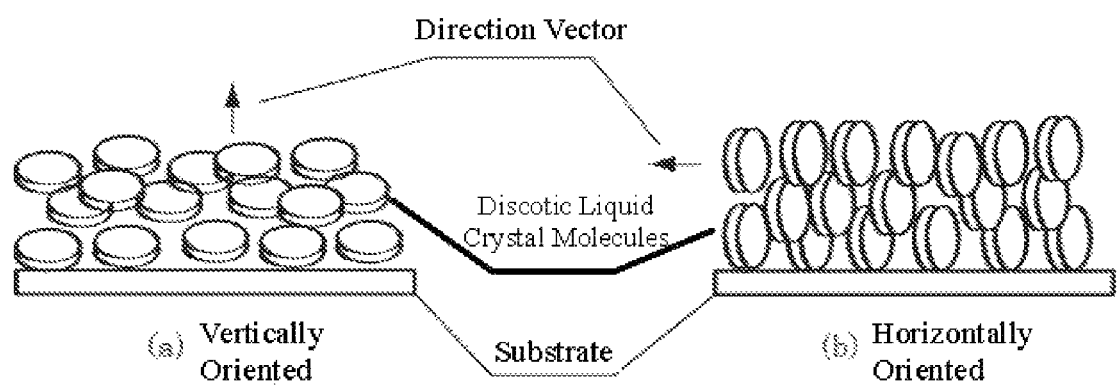
FIG. 2 is a schematic diagram of the alignment of discotic liquid crystal molecules.
Figure 3:
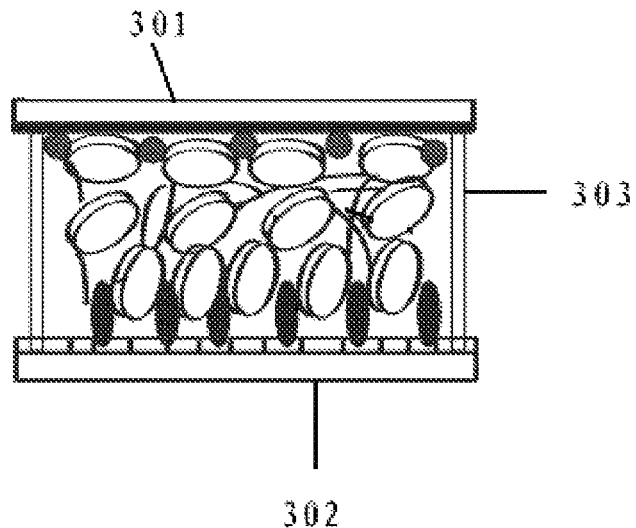
FIG. 3 is a schematic diagram of a negative optical compensation assembly provided by an embodiment of the technical disclosure.

As illustrated in FIG. 3, an embodiment of the technical disclosure provides a negative optical compensation assembly comprising a vertical alignment substrate 301 and a horizontal alignment substrate 302 disposed in parallel to each other, and a liquid crystal mixture 303 is disposed between the vertical alignment substrate 301 and the horizontal alignment substrate 302. The liquid crystal mixture 303 comprises a discotic liquid crystal polymer, an adjunct alignment agent and an ultraviolet absorption pigment. The molecules of the ultraviolet absorption pigment are accumulated on the side of the vertical alignment substrate 301, while the molecules of the adjunct alignment agent are accumulated on the side of the horizontal alignment substrate 302. From the vertical alignment substrate 301 to the horizontal alignment substrate 302, the discotic liquid crystal molecules in the discotic liquid crystal polymer exhibit hybrid alignment gradually changing from vertical alignment to horizontal alignment. The vertical alignment substrate 301 is disposed in parallel to the horizontal alignment substrate 302.

For example, the vertical alignment substrate 301 can be a vertical alignment substrate 301 comprising (for example, coated with) a vertical alignment layer which is oriented towards the liquid crystal mixture 303. Of course, a skilled artisan can dispose the vertical alignment substrate 301 in any other feasible way.

For example, the horizontal alignment substrate 302 can be a horizontal alignment substrate 302 comprising (for example, coated with) a horizontal alignment layer which is oriented towards the liquid crystal mixture 303. Of course, a skilled artisan can dispose the horizontal alignment substrate 302 in any other feasible way.

Figure 4:
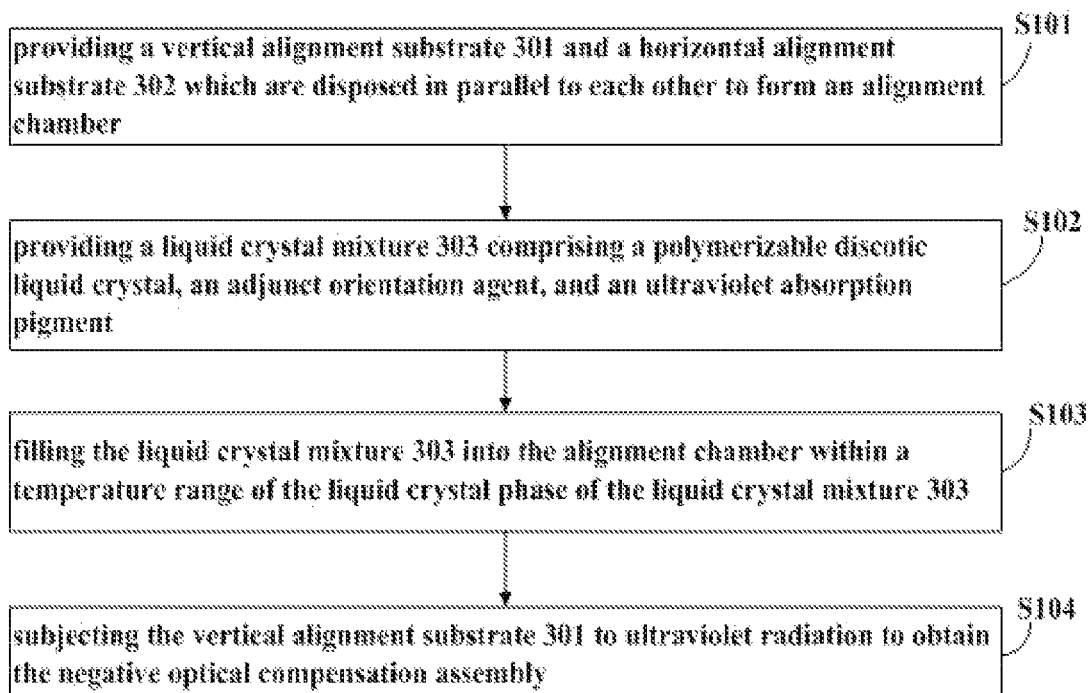
FIG. 4 is a flow chart for a method for preparing the negative optical compensation assembly provided by an embodiment of the technical disclosure.

As illustrated in FIG. 4, an embodiment of the technical disclosure provides a method for preparing a negative optical compensation assembly comprising the following processes:

S101: providing a vertical alignment substrate 301 and a horizontal alignment substrate 302 which are disposed in parallel to each other to form an alignment chamber;

S102: providing a liquid crystal mixture 303 comprising a polymerizable discotic liquid crystal, an adjunct alignment agent, and an ultraviolet absorption pigment;

S103: filling the liquid crystal mixture 303 into the alignment chamber within a temperature range of the liquid crystal phase of the liquid crystal mixture 303; and S104: subjecting the vertical alignment substrate 301 to ultraviolet radiation to obtain the negative optical compensation assembly.

The liquid crystal mixture 303 is filled into the alignment chamber at a temperature within the temperature range of the liquid crystal phase. An ultraviolet radiation is conducted from the side of the vertical alignment substrate 301. The ultraviolet absorption pigment induces the accumulation and the vertical orientation of the polymerizable discotic liquid crystals, which have a high cross-link density, on the side of the vertical alignment substrate 301. The adjunct alignment agent molecules are accumulated and cross-linked on the side of the horizontal alignment substrate 302, and its rigid group induces the horizontal alignment of adjacent discotic liquid crystal molecules, thereby achieving the hybrid alignment of the discotic liquid crystals, and obtaining the negative optical compensation assembly. Herein, the ultraviolet absorption pigment serves as an additive, but does not participate in the polymerization and does not belong to a liquid crystal polymer. Although the adjunct alignment agent is also an additive, it can participate in the polymerization. The orientation of discotic liquid crystal molecules between the vertical alignment substrate and the horizontal alignment substrates is affected by the alignment effect of the horizontal and vertical alignment substrates. The alignment effect of the vertical alignment substrate derives from the alignment effect of the vertical alignment layer (e.g., a rubbed polyimide layer) upon the discotic liquid crystal molecules; the alignment effect of the horizontal alignment substrate includes the alignment effect of the adjunct alignment agent upon the discotic liquid crystal molecules.

Figure 5:
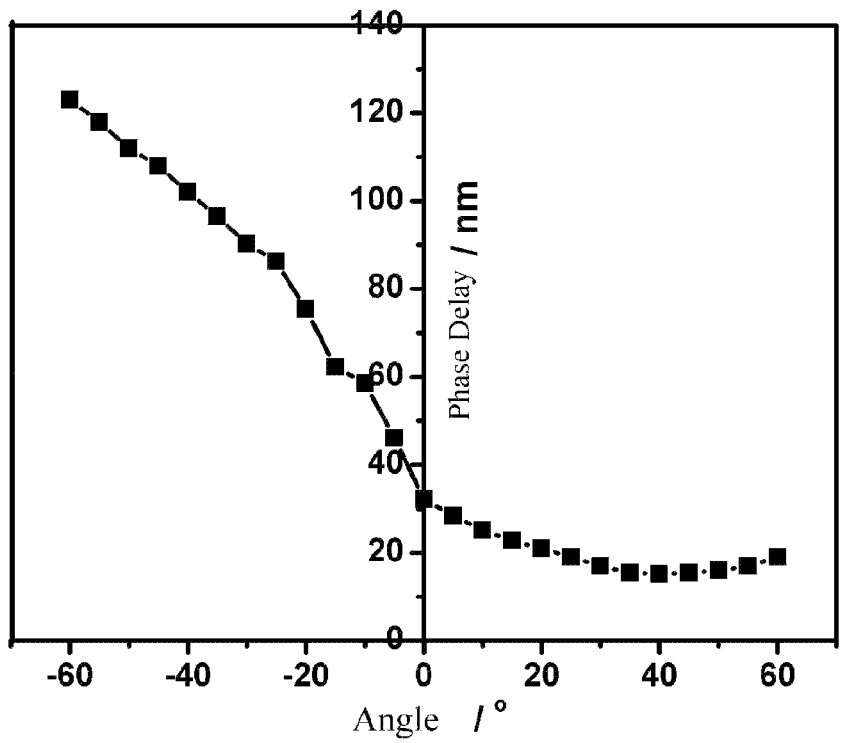
FIG. 5 is a schematic diagram of the phase delay of the negative optical compensation assembly provided by an embodiment of the technical disclosure.

A testing curve of the phase delay of an example of a negative optical compensation assembly prepared in the embodiment of the technical disclosure is illustrated in FIG. 5. The film prepared using the process has a negative optical property with a phase delay of about 120 nm, which results in an optical property for visual angle compensation. The phase delay is a major physical parameter for assessing a birefringent material and is related to the wavelength of the used light. The phase delay can be detected by using an appropriate corresponding device. Here, the phase delay is with respect to visible light, and the wavelength of the light chosen for the test is 589 nm The method for preparing the negative optical compensation assembly provided in the embodiment of the technical disclosure has the advantages of simple manufacture, good controllability, and so on. By this method, the hybrid alignment of the discotic liquid crystals can be achieved via a simple process, thereby reducing the complexity of the process for manufacturing the negative optical compensation assembly.

Figure 6:
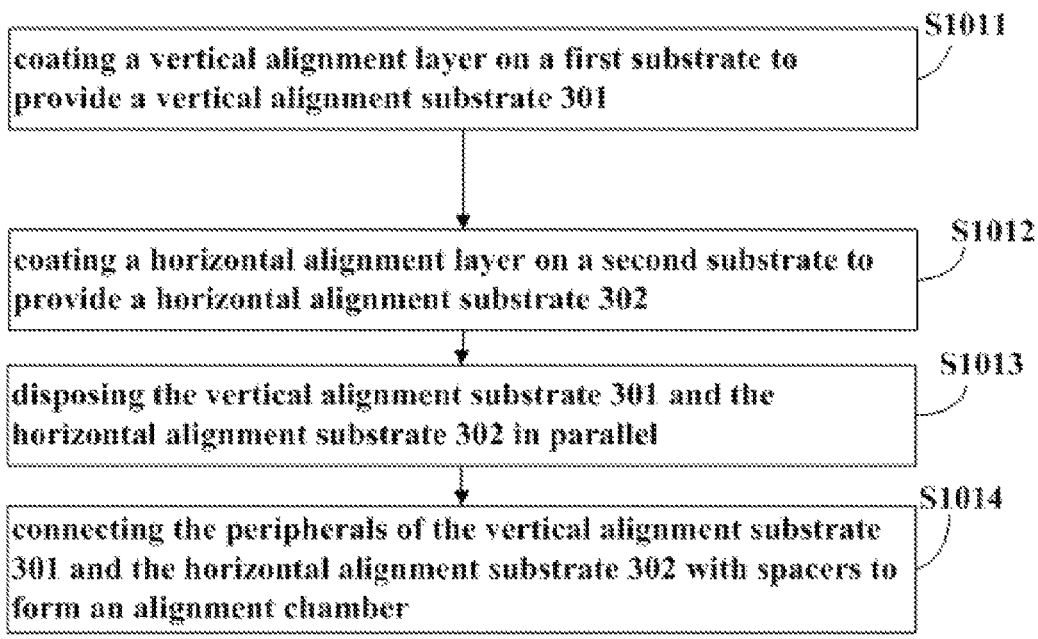
FIG. 6 is a flow chart for a method for preparing an alignment chamber provided by an embodiment of the technical disclosure.

For example, as illustrated in FIG. 6, an example of the process of providing the alignment chamber comprises:

S1411: coating a vertical alignment layer on a first substrate to provide a vertical alignment substrate 301;

S1012: coating a horizontal alignment layer on a second substrate to provide a horizontal alignment substrate 302;

S1013: disposing the vertical alignment substrate 301 and the horizontal alignment substrate 302 in parallel; and S1014: connecting the peripherals of the vertical alignment substrate and the horizontal alignment substrate with spacers to form an alignment chamber, wherein the horizontal alignment layer are oriented towards the interior of the alignment chamber.

An example of the method for preparing the vertical alignment substrate 301 comprises coating a vertical alignment layer such as polyimide on the first substrate, and after the curing of the polyimide, mechanical rubbing is conducted onto the portion coated with the polyimide on the first substrate until the vertical orientation of the polymerizable discotic liquid crystal can be achieved on the substrate.

An example of the method for preparing the horizontal alignment substrate 302 comprises coating a horizontal alignment layer of dimethyloctadecyl[3-(trimethoxysilyl)propyl] ammonium chloride for example on the second substrate to achieve the horizontal orientation of the polymerizable discotic liquid crystal. Rubbing is not necessary for the horizontal alignment substrate.

Of course, the vertical alignment substrate 301 and the horizontal alignment substrate 302 may be prepared by a skilled artisan using another feasible method which is not described in details here for simplicity.

For example, the height of the spacers can be within the range of 10 μm-300 μm, preferably 100 μm, to ensure the proper amount of the liquid crystal mixture 303 filled, thereby enabling the negative optical compensation assembly to achieve good compensation effect. Of course, a skilled artisan may set the thickness of the spacers to another feasible value.

An example of the method for providing the liquid crystal mixture 303 may comprise the following processes:

S1021: obtaining an organic mixture by mixing and dissolving into an organic solvent 70%-95% by weight of a polymerizable discotic liquid crystal, 5%-30% by weight of an adjunct alignment agent, 0.1%-30% by weight of an ultraviolet absorption pigment, 0.1%40% by weight of a photo-initiator, and 0.01%-10% by weight of a heat polymerization inhibitor;

S1022: subjecting the organic mixture to a dispersion treatment until the organic mixture is mixed thoroughly; and S1023: volatilizing the organic solvent in the organic mixture to obtain the liquid crystal mixture 303.

For example, the organic solvent is one of the following or any combination thereof: ethanol, acetone, dichloromethane, trichloromathane, carbon tetrachloride, tetrahydrofuran, isopropanol, cyclohexane, benzene, toluene, and xylene.

For example, the polymerizable discotic liquid crystal can be a polymerizable discotic liquid crystal composed of symmetric or asymmetric discotic liquid crystal molecules comprising flexible side chains having a polymerizable terminal group and a rigid disc core.

For example, the adjunct alignment agent can be an adjunct alignment agent composed of rod-like nematic liquid crystal molecules comprising a polymerizable terminal group and a rigid terminal group.

For example, the polymerizable terminal group can be one of the following or any combination thereof: acrylate, methacrylate, styryl, and diacetyl. The rigid disc core can be one of the following or any combination thereof: phloroglucine, azine, perylene, benzophenanthrene, truxene, hexaethynylbenzene, and hexabenzocoronene. The rigid terminal group can be a rod-like liquid crystal comprising a rigid functional group, and the rigid functional group can be one of the following rigid functional groups or any combination thereof: biphenyl, diphenylethyne, azobenzene, terphenyl and the like. Of course, the rigid terminal group can also be one of the following rigid functional groups or any combination thereof: biphenyl, diphenylethyne, azobenzene, terphenyl and the like.

For example, the polymerizable discotic liquid crystal may be a polymerizable discotic liquid crystal composed of symmetric or asymmetric discotic liquid crystal molecules obtained by linking a flexible side chain polymerizable having a terminal group and a rigid disc core via a linkage; the adjunct alignment agent is an adjunct alignment agent composed of rod-like nematic liquid crystal molecules obtained by linking a polymerizable terminal group and a rigid terminal group via a linkage; and for example, the linkage may be one of the following or any combination thereof: ether linkage, ester linkage, amide linkage, or carbonate linkage.

Of course, a skilled artisan may employ other feasible polymerizable discotic liquid crystal and adjunct alignment agents which are not described in details herein.

The dispersion treatment of the organic mixture is for example an ultrasound treatment. The duration of the ultrasound treatment of the organic mixture may be 1-60 minutes.

Under the action of ultraviolet radiation, the ultraviolet absorption pigments can accumulate on the side of the vertical alignment substrate 301 and induce the accumulation and the presence of vertical orientation of the polymerizable discotic liquid crystal which have a large cross-linking density; the adjunct alignment agent molecules are accumulated in the vicinity of the side of the horizontal alignment substrate 302, and the rigid terminals of the adjunct alignment agent molecules induce the horizontal alignment of the adjacent discotic liquid crystal molecules; and therefore, from top to bottom of the interior of the alignment substrate, a hybrid alignment gradually changing from vertical to horizontal alignment is exhibited.

Of course, a skilled artisan may also employ another feasible way to prepare the liquid crystal mixture 303.

The phrase "within a temperature range of the liquid crystal phase of the liquid crystal mixture 303", for example, may mean within the temperature range of the intermediate phase of liquid crystals of the liquid crystal mixture 303. For a further example, filling of the liquid crystal mixture 303 into the alignment chamber may be conducted in a vacuum condition. For example, the alignment chamber may be placed into the liquid crystal mixture 303 and the liquid crystal mixture 303 may be placed into the vacuum chamber. Under the vacuum condition, the liquid crystal mixture 303 will spontaneously be filled into the alignment chamber.

For example, an example of subjecting the vertical alignment substrate to ultraviolet radiation is to use an ultraviolet light source for the ultraviolet radiation upon the vertical alignment substrate 301 at intensity of 0.001-100 mW/cm$^2$ until the liquid crystal mixture 303 polymerizes and cross-links. The duration of the radiation may last for 1-60 minutes.

For example, an ultraviolet light source with a wavelength of 365 nm can be used for ultraviolet radiation at 1-100 cm right above the vertical alignment substrate 301 for polymerization and cross-liking of the vertical alignment substrate 301. The duration of the radiation may last for 1-60 minutes and the intensity of the radiation may be 50 mW/cm$^2$.

An example of the method for preparing the negative optical compensation assembly of an embodiment of the technical disclosure comprises the following steps.

First, an alignment chamber is provided. One substrate of the alignment chamber is the vertical alignment substrate 301. Polyimide is coated on this substrate and a vertical alignment layer is formed via an alignment process by rubbing to provide the vertical alignment substrate 301. Another substrate is the horizontal alignment substrate 302. For example, dimethyloctadecyl[3-(trimethoxysilyl)propyl]ammonium chloride is coated as a horizontal alignment layer on the substrate to provide the horizontal alignment substrate 302. The vertical alignment substrate 301 and the horizontal alignment substrate 302 are placed in parallel, and for example spacers of 100 μm in height are employed to connect the peripherals of the two sides of the two substrates to form the alignment chamber such that the vertical alignment layer and the horizontal alignment layer are within the alignment chamber.

Figure 7:
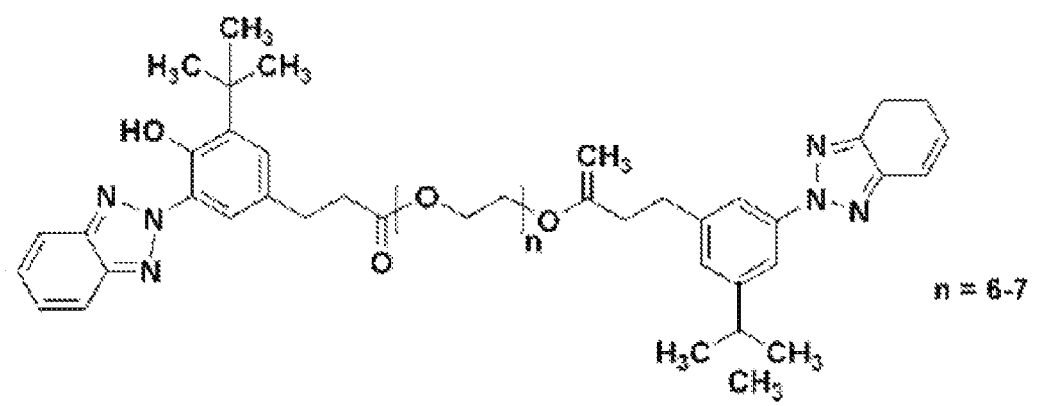
FIG. 7 is a schematic diagram of the chemical formula of an ultraviolet absorption pigment, Tinuvin 1130, provided by an embodiment of the technical disclosure.

Second, the liquid crystal mixture 303 is prepared. 80% by weight of a polymerizable discotic liquid crystal (2,3,6,7,10, 11-hexa-[4-(6-acroyloxyhexyloxy)]benzophenanthrene ester), 10% by weight of an adjunct alignment agent (xenyl acroyloxyhexyloxybenzoate), 5% by weight of an ultraviolet absorption pigment, 2% by weight of a photoinitiator (a,a-dimethoxy-a-phenylacetophenone), and 3% by weight of a heat polymerization inhibitor (2,6-di-tert-butylphenol) are mixed, dissolved into an organic solvent for 60 minutes by ultrasound treatment, and mixed thoroughly, followed by volatilization of the organic solvent to provide the liquid crystal mixture 303. The ultraviolet absorption pigment may be Tinuvin 1130, molecular formula of which is illustrated in FIG. 7.

Subsequently, the aforementioned liquid crystal mixture 303 is filled into the alignment chamber of the alignment element under vacuum within the temperature range of the intermediate phase of the liquid crystals in the liquid crystal mixture 303.

An ultraviolet light source with a wavelength of 365 nm is used for ultraviolet radiation at 30 cm right above the vertical alignment substrate 301 for polymerization and cross-liking for 60 minutes at an intensity of the radiation of 50 mW/cm$^2$.

Under the action of the ultraviolet radiation, the ultraviolet absorption pigments are accumulated on the side of the vertical alignment substrate 301 and induce the accumulation of the polymerizable discotic liquid crystal molecules which have a large cross-linking density, while the polymerizable discotic liquid crystal molecules exhibit vertical orientation due to the action of the vertical alignment layer. The function of the ultraviolet absorption pigment is to absorb the ultraviolet light. Because the ultraviolet intensity within the film gradually decreases, the ultraviolet absorption pigment molecules will move towards the side where the ultraviolet intensity is the strongest.

In the liquid crystal mixture, the polymerizable discotic liquid crystal serves as the principal part of the optical compensation assembly which obtains a hybrid alignment state after the treatment, and accordingly a film with negative optical compensation can be obtained after polymerization. The adjunct alignment agent plays the role of adjunct orientation upon the horizontal orientation of the discotic liquid crystal while also participates the polymerization of the polymerizable discotic liquid crystal, which can become a part of the final polymer, but usually its amount is low. During the process of single-side ultraviolet radiation, the ultraviolet absorption pigment will accumulate on the side of the radiation, thereby generating an uneven distribution, which, by further combining with the action of the horizontal alignment substrate and the adjunct alignment agent, will achieve the hybrid alignment state of the discotic liquid crystal. The photoinitiator initiates the polymerization and cross-linking of the polymerizable terminal groups of the adjunct alignment agent molecule and the polymerizable terminal groups of the polymerizable discotic liquid crystal under the ultraviolet radiation. A common polymerization photoinitiator can be employed here. Since the embodiment of the technical disclosure requires the molecular rearrangement under the liquid crystal phase of the discotic liquid crystal followed by curing with ultraviolet radiation, but the liquid crystal phase temperature of the discotic liquid crystal is generally high, a heat polymerization inhibitor can be added to prevent the polymerizable molecules from undergoing heat polymerization during heating or incubation, and the heat polymerization results in the failure to obtain the required hybrid alignment state.

More adjunct alignment agent molecules will accumulate in the region of the inter side of the horizontal alignment substrate 302 and exhibit alignment perpendicular to the substrate due to the action of the horizontal alignment layer. The rigid terminals of the adjunct alignment agent molecule induce the accumulation of the discotic liquid crystal molecules within the region, which exhibit horizontal orientation due to the action of the horizontal alignment layer. Consequently, in the alignment chamber, from the vertical alignment substrate 301 to the horizontal alignment substrate, a hybrid alignment gradually changing from vertical alignment to horizontal alignment is exhibited. Moreover, due to the action of the ultraviolet radiation, the polymerizable discotic liquid crystal is polymerized to form a negative optical film, thereby providing a negative optical compensation assembly having a visual angle compensation property.

The embodiments of the technical disclosure provides a negative optical compensation assembly and a method for preparing the same, which can achieve the hybrid alignment of discotic liquid crystal molecules by a simple process, and can reduce the complexity of the process for manufacturing the negative optical compensation assembly.

The embodiments of the technical disclosure being thus described, it will be obvious that the same may be varied in many ways. Such variations are not to be regarded as a departure from the spirit and scope of the technical disclosure, and all such modifications as would be obvious to those skilled in the art are intended to be included within the scope of the following claims.

What is claimed is:

1. A negative optical compensation assembly comprising a vertical alignment substrate and a horizontal alignment substrate disposed in parallel to each other, wherein a liquid crystal mixture is disposed between the vertical alignment substrate and the horizontal alignment substrate, and wherein the liquid crystal mixture comprises a discotic liquid crystal polymer, an adjunct alignment agent and an ultraviolet absorption pigment, the molecules of the ultraviolet absorption pigment are accumulated on a side of the vertical alignment substrate, the molecules of the adjunct alignment agent are accumulated on a side of the horizontal alignment substrate, and from the vertical alignment substrate to the horizontal alignment substrate, the discotic liquid crystal molecules in the discotic liquid crystal polymer exhibit hybrid alignment gradually changing from vertical alignment to horizontal alignment.

2. The negative optical compensation assembly according to claim 1, wherein the vertical alignment substrate comprises a vertical alignment layer oriented towards the liquid crystal mixture; and the horizontal alignment substrate comprises a horizontal alignment layer oriented towards the liquid crystal mixture.

3. A method for preparing a negative optical compensation assembly comprising providing a vertical alignment substrate and a horizontal alignment substrate which are disposed in parallel to each other to form an alignment chamber;

providing a liquid crystal mixture comprising a polymerizable discotic liquid crystal, an adjunct alignment agent, and an ultraviolet absorption pigment;

filling the liquid crystal mixture into the alignment chamber within a temperature range of the liquid crystal phase of the liquid crystal mixture; and subjecting the vertical alignment substrate to ultraviolet radiation so as to polymerize the polymerizable discotic liquid crystal within the alignment chamber into a discotic liquid crystal polymer, thereby obtaining the negative optical compensation assembly.

4. The method according to claim 3, wherein providing a vertical alignment substrate and a horizontal alignment substrate comprises:

coating a vertical alignment layer on a first substrate to provide the vertical alignment substrate; and coating a horizontal alignment layer on a second substrate to provide the horizontal alignment substrate.

5. The method according to claim 3, wherein disposing the vertical alignment substrate and the horizontal alignment substrate in parallel to each other to form an alignment chamber comprises:

connecting peripherals of the vertical alignment substrate and the horizontal alignment substrate with spacers to form the alignment chamber, wherein the vertical alignment substrate is parallel to the horizontal alignment substrate and the vertical alignment layer and the horizontal alignment layer are oriented towards the interior of the alignment chamber.

6. The method according to claim 3, further comprising:

obtaining an organic mixture by mixing and dissolving into an organic solvent 70%-95% by weight of a polymerizable discotic liquid crystal, 5%-30% by weight of an adjunct alignment agent, 0.1%-30% by weight of an ultraviolet absorption pigment, 0.1%-10% by weight of a photoinitiator, and 0.01%-10% by weight of a heat polymerization inhibitor;

subjecting the organic mixture to an ultrasound treatment until the organic mixture is mixed thoroughly; and volatilizing the organic solvent in the organic mixture to obtain the liquid crystal mixture.

7. The method according to claim 6, wherein the organic solvent is one of the following or any combination thereof:

ethanol, acetone, dichloromethane, trichloromathane, carbon tetrachloride, tetrahydrofuran, isopropanol, cyclohexane, benzene, toluene, and xylene.

8. The method according to claim 3, wherein subjecting the vertical alignment substrate to ultraviolet radiation comprises using an ultraviolet light source for the ultraviolet radiation upon the vertical alignment substrate at an intensity of 0.001-100 mW/cm$^2$ until the liquid crystal mixture polymerizes and cross-links.

9. The method according to claim 3, wherein the polymerizable discotic liquid crystal is a polymerizable discotic liquid crystal composed of symmetric or asymmetric discotic liquid crystal molecules comprising a flexible side chain polymerizable having a terminal group and a rigid disc core.

10. The method according to claim 9, wherein the polymerizable terminal group is one of the following or any combination thereof: acrylate, methacrylate, styryl, and diacetyl.

11. The method according to claim 9, wherein the rigid disc core is one of the following or any combination thereof: phloroglucin, azine, perylene, benzophenanthrene, truxene, hexaethynylbenzene, and hexabenzocoronene.

12. The method according to claim 3, wherein the adjunct alignment agent is an adjunct alignment agent composed of rod-like nematic liquid crystal molecules comprising a polymerizable terminal group and a rigid terminal group.

13. The method according to claim 12, wherein the polymerizable terminal group is one of the following or any combination thereof: acrylate, methacrylate, styryl, and diacetyl.

14. The method according to claim 12, wherein the rigid terminal group is a rod-like liquid crystal comprising a rigid functional group.

\* \* \* \* \*